UNITED STATES PATENT OFFICE.

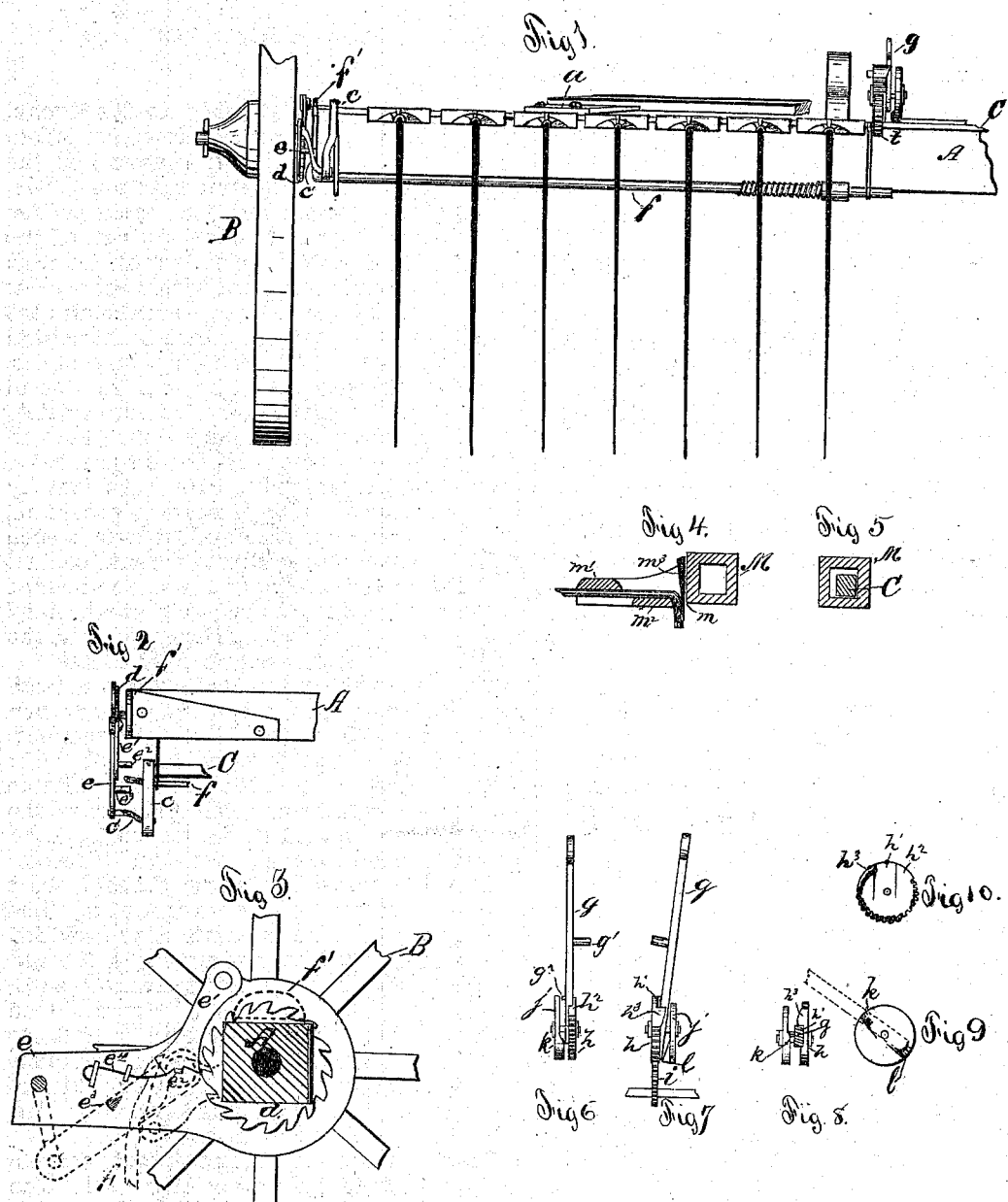

STEPHEN I. LYND AND EDGAR M. TOUSLEY, OF ALBION, NEW YORK.

IMPROVEMENT IN HORSE HAY-RAKES.

Specification forming part of Letters Patent No. 129,743, dated July 23, 1872.

Specification describing certain Improvements in Horse Hay-Rakes, invented by STEPHEN I. LYND and EDGAR M. TOUSLEY, of Albion, in the county of Orleans and State of New York.

This invention relates to that class of horse hay-rakes in which the teeth are elevated to discharge the load by means of the movement of one of the supporting-wheels, suitable mechanism being employed to connect the rake-head to the moving wheel when it is desired to elevate the rake, and to disengage the same when the load has been discharged; and it consists, first, in the peculiar mechanism employed to connect the rake-head, when desired, to the moving wheel, and to disengage the same from it; second, in the peculiar construction of a lever device, designed mainly for holding the teeth up to their work, and for elevating them when the machine is backing; third, in the combination of a rake-head of peculiar construction with sockets for holding the teeth; and, fourth, in the specific construction of the tooth-sockets.

To enable others skilled in the art to make and use our invention, we will now proceed to describe fully its construction and operation.

In the drawing, Figure 1 represents a rear elevation of a rake having our improvements applied thereto; and Figs. 2, 3, 4, 5, 6, 7, 8, 9, and 10, views of parts detached.

A represents the axle of the machine, supported by the wheels B, and having attached in any suitable manner the shafts $a$. C represents the rake-head, consisting of a wrought bar of angular form, preferably square, which is hung in suitable bearings attached to the rear of the axle, as shown. $c$ represents an arm rigidly attached to the rake-head, which arm is connected by means of a rod, $c'$, with the elevating mechanism, which will now be described. $d$ represents a ratchet-wheel, which is rigidly secured to the main wheel B, so as to revolve with it, by means of a sleeve. $e$ represents a lever, which is loosely connected at one end, by means of a suitable opening, to the sleeve which unites the ratchet-wheel to the main wheel, the free end of the same being connected by the rods $c'$ to the arm $c$ attached to the rake-head. This lever $e$ is provided with a stop, $e^3$, and also with a pawl, $e^1$, having a projection, $e^2$, as shown. $e^4$ represents a spring, also attached to the lever $e$, which is adapted, by means of its construction, to hold the pawl $e^1$ either in contact with the ratchet-wheel $d$ or away from it, as may be desired. $f$ represents a lever, the main portion of which is hung in bearings in rear of the axle, the inner end of which is provided with an arm extending upward within convenient reach of the driver, the outer end being bent in such manner as to rest, when in its natural position, between the stop $e^3$ and the projection $e^2$ of the pawl $e^1$. The extreme end of this part of the lever is provided with a catch, which engages with the stop $e^3$ for the purpose of holding down the lever $e$ and rake, preventing the latter from rising accidentally from any cause. $f'$ represents a cam-plate, attached to the upper side of the axle in such a position as to cause it to come into contact with the projection $e^2$ upon the pawl when the latter is carried up by the ratchet-wheel, by which means the pawl is disengaged from the wheel and the teeth are permitted to fall.

The lever mechanism, for holding the teeth up to the work and for elevating them when the machine is backing, will now be described. $g$, Figs. 6, 7, and 8, represents the lever proper, which is pivoted between suitable standards at some convenient point upon the axle. It is provided with a foot-rest, $g^1$, and a stud or projection, $g^2$, as shown. $h$ represents a disk, loosely hung upon the same shaft or pin on which the lever turns, which disk has a portion of its circumference provided with teeth, which engage with the toothed segment $i$, rigidly secured to the rake-head C, as shown. The disk $h$ is further provided upon its inner face with a recess, $h^1$, and the consequent projections $h^2$ $h^3$. $j$ represents the standard adjacent to the lever on the side opposite to the disk, which standard is provided with the projections $k$ $l$, as shown.

The manner of attaching the tooth-sockets to the rake-head will now be described. The bar C, as before described, is made of wrought-iron, of angular form, preferably square. M represents the tooth-sockets, made of cast-iron, the body of which is provided with an angular opening corresponding in form with the form of the rake-head, but of larger size, in practice the rake-head being made of iron three-quarters of an inch square, and the sockets having an opening seven-eighths of an inch square.

The specific construction of the socket is peculiar. In addition to the square opening, by means of which they are attached to the rake-head, they are provided with a socket, $m$, for the bent end of the tooth, and with bearing-surfaces, $m^1 m^2$, above and below for supporting it. $m^3$ represents a key, by means of which the tooth is securely held in place.

The operation of our improved machine in its various parts will now be described. The manner of using the rake generally is similar to other rakes of this class. As it is driven across the field the hay is gathered by the teeth in the usual manner, until it is desired to deposit the load. The operator then presses with his foot upon the inner arm of lever $f$, by which means the short arm is caused to bear against the projection $e^2$ of the pawl $e^1$, and to throw the latter into contact with the ratchet-wheel. The movement of the main wheel is thus communicated, by means of the lever $e$ and rod $c'$, to the arm $c$ of the rake-head, by means of which the latter is turned in its bearing, and the teeth being thereby elevated the load is deposited. When the lever $e$ has risen a certain distance the projection $e^2$ of the pawl comes in contact with the cam-plate $f'$, by means of which it is lifted and disengaged from the ratchet-wheel, the result of this operation being to free also the lever $e$ and its connections uniting it to the rake-head, and, consequently, the latter is free to turn, and the teeth to fall again into the proper position.

The operation of the lever mechanism for holding the teeth up to the work, and for elevating the teeth when the machine is backing, is as follows: To elevate the teeth it is simply necessary to throw back the lever $g$, which lever, bearing against the projection $h^3$, causes the disk $h$ to revolve and communicate motion to the segment $i$, by which means the rake-head C is turned and the teeth elevated. To hold the teeth down to their work, especially in raking heavy grass, the operator keeps his foot upon the foot-rest $g^1$, by which means the lever is caused to bear strongly against the projection $h^2$ of the disk $h$, which is thus securely held, and, consequently, also the rake-head, through the connections described. If it is desired to deposit the load at any time, this result is accomplished without interfering with the operation of the lever $g$ in the following manner: The lever $f$ being moved, the elevating mechanism before described is caused to operate, and the rake-head is, consequently, turned to elevate the teeth. As the segment $i$ upon the rake-head turns it revolves of course the disk $h$; but when the lever $g$ has been in consequence moved backward slightly, its stud $g^2$ moves out of contact with the projection $k$, and its lower end is brought into contact with the projection $l$, by which means its upper end is thrown out of the recess $h^1$, and the disk is free to move without it. When the disk is returned to its proper place by the falling of the teeth, the reverse operation takes place, and the lever assumes its natural position—that is, it rests in the recess $h^1$, bearing against the projection $h^2$, it being securely held against accidental displacement by its projection $g^2$, which bears against the projection $k$.

From this description it will be understood that when the elevating mechanism is operated the lever $g$ has a slight movement backward, by which means it is disengaged from the recess of the disk, and the latter is free to move without it.

The manner of attaching the sockets which hold the teeth to the rake-head is especially advantageous. By making the openings of the sockets larger than the bar which supports them, each tooth has an independent movement to a certain extent, by which means they are saved from injurious contact with bowlders or other obstacles. By means of the specific construction of the sockets the teeth may be readily removed at any time, if desired, and be replaced by others.

Having thus fully described our invention, what we claim as new, and desire to secure by Letters Patent, is—

1. The lever $e$ having the stop $e^3$ and pawl $e^1$, with projection $e^2$, in combination with the cam $f'$ and lever $f$ having a catch, as described.

2. The combination of the pivoted lever $g$, the loose disk $h$ having projections $h^2 h^2$, as described, the stationary standard $j$ having projections $k l$, as described, with a rake-head, C, having a segment, $i$, all substantially as described, for the purpose set forth.

3. The combination of a rake-head formed of an angular bar with a tooth-socket having an angular opening, the area of the bar in cross-section being less than the area of the opening, as and for the purpose described.

4. The socket M, with the bearing-surfaces $m^1 m^2$ and socket or recess $m$, in combination with the hooked tooth and the key $m^3$, the parts being arranged as described, for the purpose set forth.

STEPHEN I. LYND.
EDGAR M. TOUSLEY.

Witnesses:
C. H. MOORE,
S. S. SPENCER.